United States Patent [19]
Holzworth

[11] 3,829,063
[45] Aug. 13, 1974

[54] ARTICULATED PLATFORM FOR HAND TRUCKS AND THE LIKE

[76] Inventor: George R. Holzworth, Crove St. R.F.D., Plympton, Mass. 02367

[22] Filed: Mar. 14, 1973

[21] Appl. No.: 341,309

[52] U.S. Cl............ 254/2 R, 214/1 D, 254/DIG. 1, 254/DIG. 4, 254/93 R
[51] Int. Cl............................................. B60p 1/00
[58] Field of Search .......... 254/2 R, 2 B, 2 C, 93 R, 254/84, DIG. 1, DIG. 4, 87, 1; 214/1 D

[56] References Cited
UNITED STATES PATENTS

| | | | |
|---|---|---|---|
| 732,142 | 6/1903 | Tuggle et al. | 254/2 B |
| 904,919 | 11/1908 | Baldwin | 254/93 R |
| 2,600,741 | 6/1952 | Drum | 254/DIG. 4 |
| 2,891,764 | 6/1959 | Pearne | 254/1 |
| 3,743,248 | 7/1973 | Moor | 254/93 R |

*Primary Examiner*—Al Lawrence Smith
*Assistant Examiner*—Robert C. Watson

[57] ABSTRACT

A platform primarily intended for installation on a handtruck, can be raised and lowered hydraulically and rotated manually.

1 Claim, 3 Drawing Figures

PATENTED AUG 13 1974　　3,829,063
FIG. 1
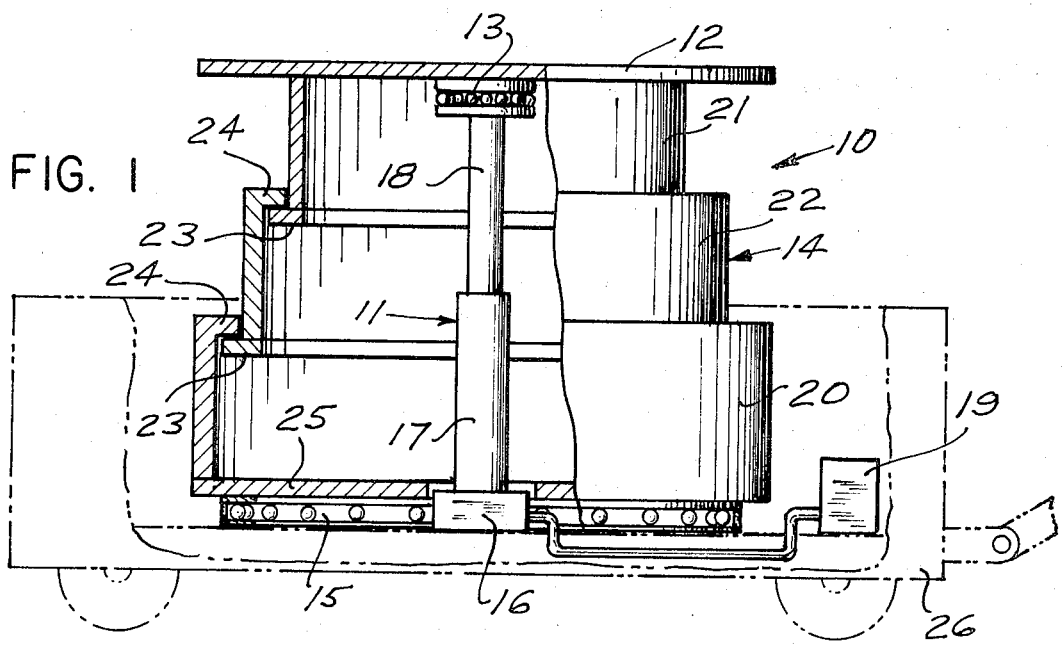
FIG. 2
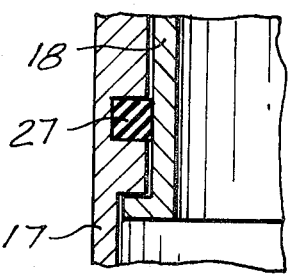
FIG. 3

ARTICULATED PLATFORM FOR HAND TRUCKS AND THE LIKE

This invention relates to cargo handling equipment and more specifically to cargo moved on hydraulic hand trucks.

A principal object of this invention is to provide a means that permits the operator of a hand truck fitted with hydraulic power to raise and lower cargo within the range of the design and at the same time or at any elevation permits the operator to rotate the cargo on its platform manually. A vertically-oriented hydraulic cylinder supports the platform. For the purpose of maintaining platform rigidity against off-center loads, the platform rests on the innermost section of two or more telescoping enclosures. The largest or bottommost section rests on an annular ball bearing. Thus, while the cargo is continually and steadily supported directly from the floor of the hand truck at any elevation of the hydraulic cylinder, the cargo is freed for turning manually. Where the piston of a hydraulic cylinder turns readily, connection is made directly at the top to the platform. Alternately, there may be interposed a ball-bearing between the platform and the top of the piston.

Another object of the present invention is to provide a cargo platform of the type described that is rugged, dependable for long use, simple to maintain, can be flexibly designed for many cargo situations, yet being of relatively simple construction, can be manufactured at a cost that will lend itself to a wide market appeal.

These and other objects will become evident upon a study of the following specification together with the accompanying drawing whrein:

FIG. 1 is an elevation view partly in section, shown installed on a hand truck;

FIG. 2 is a plan view of the platform;

FIG. 3 is an enlarged fragmentary section elevation view showing the addition of a square gasket between a pair of the telescoping sections.

Referring to FIGS. 1 and 2, there is shown a platform 10, according to the invention, comprising a hydraulic lift 11, a stage 12, a load-carrying bearing 13, a telescoping support means 14 and a support bearing 15.

Hydraulic lift 11, supported on a base 16, shows a stationary cylinder 17 and a moveable piston 18 operable in the usual manner from a hydraulic power source 19.

Telescoping means 14 shows a bottom or outside sleeve 20, a top or inside sleeve 21 and one or more intermediate sleeves 22. Extension of the telescoping sections is limited in the usual manner as by flanges 23 but the bottom of each moveable section coming in contact with top flanges 24. Bottom section 20 shows a horizontal member 25 provided for support of the lower cylindrical section. Member 25 is rotatably supported by support bearing 15. The lower race of bearing 15 is secured to the floor of truck 26. A study of the figure and an understanding of the above description will make it clearly evident that a cargo may be moved on or off platform 12 at any elevation in the range provided and at the same time permit the operator to orient the load by rotating it manually. The advantages of being able to turn the load to any direction and to set the load at any elevation become immediately evident.

Where the hydraulic cylinder is constructed to be freely rotatable, as for instance being provided with a square gasket as shown in FIG. 3, bearing 13 may be dispensed with.

The preferred embodiment that has been described and illustrated should not be construed as limiting the scope of the invention, as the various parts described may differ in construction and/or appearance without altering the basic operable means.

What I now claim is:

1. An articulated platform for hand trucks and the like, comprising in combination, a vertically upright hydraulic lift, a base below said hydraulic lift for supporting said hydraulic lift there upon, said base being supportable upon a floor of a truck, said hydraulic lift including a cylinder which at its lower end rest upon said base, and a piston upwardly slideable from an upper end of said cylinder, an upper end of said piston having a load carrying bearing means upon which a horizontal stage is supported, said load carrying bearing means providing relative rotation between said stage and said piston, said stage forming a circular top wall of an upper section, said top wall being integral with a cylindrical side wall located there below, a lower end of said cylindrical side wall being integral with a radially outwardly extending flange, said flange, cylindrical side wall and stage together forming said top section, said top section being slideably mounted into an intermediate section so that said flange abuts against an upper end of said intermediate section, said intermediate section comprising a cylindrical side wall which at its upper end includes a radially inwardly extending flange for abutment against an upper side of said upper section flange, and a lower edge of said intermediate section cylindrical side wall being integral with a radially outwardly extending flange, said intermediate section being slideably mounted into a lower section, said lower section including a cylindrical side wall which at its upper end is integral with a radially inwardly extending flange for abutment against an upper side of said intermediate section lower flange, a lower end of said bottom section cylindrical side wall resting upon a horizontal member placed upon a support bearing means, which support bearing means rests upon said base, said support bearing means providing relative rotation between said bottom section and said base.

* * * * *